US012259186B2

(12) United States Patent
MacRae

(10) Patent No.: US 12,259,186 B2
(45) **Date of Patent: *Mar. 25, 2025**

(54) SINGLE MOUNTING CAST IRON OR COPPER STAVE COOLER

(71) Applicant: MacRae Technologies, Inc., Hayward, CA (US)

(72) Inventor: Allan J. MacRae, Hayward, CA (US)

(73) Assignee: MACRAE TECHNOLOGIES, INC., Hayward, CA (US)

( * ) Notice: Subject to any disclaimer, the term of this patent is extended or adjusted under 35 U.S.C. 154(b) by 153 days.

This patent is subject to a terminal disclaimer.

(21) Appl. No.: 16/642,903

(22) PCT Filed: Sep. 14, 2018

(86) PCT No.: PCT/US2018/051231

§ 371 (c)(1),
(2) Date: Feb. 28, 2020

(87) PCT Pub. No.: WO2019/099097

PCT Pub. Date: May 23, 2019

(65) Prior Publication Data

US 2024/0219120 A1 Jul. 4, 2024

Related U.S. Application Data

(63) Continuation-in-part of application No. 15/815,343, filed on Nov. 16, 2017, now Pat. No. 9,963,754, and (Continued)

(51) Int. Cl.
*F27D 1/12* (2006.01)
*F27D 9/00* (2006.01)

(52) U.S. Cl.
CPC ........ *F27D 1/12* (2013.01); *F27D 2009/0021* (2013.01); *F27D 2009/0062* (2013.01)

(58) Field of Classification Search
CPC ............... F27D 1/12; F27D 2009/0021; F27D 2009/0062; F27D 1/004; F27D 2009/0067;

(Continued)

(56) References Cited

U.S. PATENT DOCUMENTS 5,426,664 A * 6/1995 Grove ....................... F27B 3/24 373/76
6,580,743 B1 * 6/2003 Hirata ....................... C21B 7/10 373/76

(Continued)

*Primary Examiner* — Jessee R Roe
*Assistant Examiner* — Michael Aboagye
(74) *Attorney, Agent, or Firm* — HOLLAND & HART LLP

(57) ABSTRACT

All of a cast-iron or cast-copper stave cooler's weight is supported inside a furnace containment shell by single gas-tight steel collar on the backside. All the coolant piping in each cooler has every external connection collected and routed together through the one steel collar. A wear protection barrier is disposed on the hot face. Such is limited to include at least one of horizontal rows of ribs and channels that retain metal inserts or refractory bricks, or pockets that assist in the retention of castable cement and/or accretions frozen in place from a melt, or an application of an area of hardfacing that is welded on in bead, crosshatch, or weave pattern.

5 Claims, 10 Drawing Sheets

Related U.S. Application Data a continuation-in-part of application No. 15/968,272, filed on May 1, 2018, now abandoned, and a continuation-in-part of application No. 16/101,418, filed on Aug. 11, 2018, now Pat. No. 10,364,475, which is a continuation-in-part of application No. 15/815,343, filed on Nov. 16, 2017, now Pat. No. 9,963,754, application No. 16/642,903 is a continuation-in-part of application No. 16/290,922, filed on Mar. 3, 2019, now Pat. No. 10,954,574, which is a continuation-in-part of application No. 16/101,418, filed on Aug. 11, 2018, now Pat. No. 10,364,475, which is a continuation-in-part of application No. 15/815,343, filed on Nov. 16, 2017, now Pat. No. 9,963,754, said application No. 16/290,922 is a continuation-in-part of application No. 13/147,996, filed as application No. PCT/US2011/030591 on Mar. 30, 2011, now abandoned, said application No. 16/290,922 is a continuation-in-part of application No. 13/148,003, filed on Dec. 23, 2011, now Pat. No. 10,247,477, application No. 16/642,903 is a continuation-in-part of application No. 16/712,912, filed on Dec. 12, 2019, now Pat. No. 10,684,078, which is a continuation-in-part of application No. 16/422,909, filed on May 24, 2019, now abandoned.

(60) Provisional application No. 62/701,832, filed on Jul. 22, 2018, provisional application No. 61/318,977, filed on Mar. 30, 2010, provisional application No. 61/319,089, filed on Mar. 30, 2010.

(58) Field of Classification Search
CPC ................ F28F 2275/06; F28F 21/082; F28D 2021/0056; F28D 2021/0078; F27B 1/14; C21C 5/4646; C21B 7/10
USPC ........................................ 266/190, 193, 194
See application file for complete search history.

(56) References Cited

U.S. PATENT DOCUMENTS

| | | | | |
|---|---|---|---|---|
| 6,742,699 | B2 * | 6/2004 | Saarinen | F27D 1/12 266/286 |
| 8,377,513 | B2 * | 2/2013 | Saarinen | F27B 3/24 427/457 |
| 10,982,902 | B2 * | 4/2021 | MacRae | C21B 7/10 |

* cited by examiner

Fig. 3A
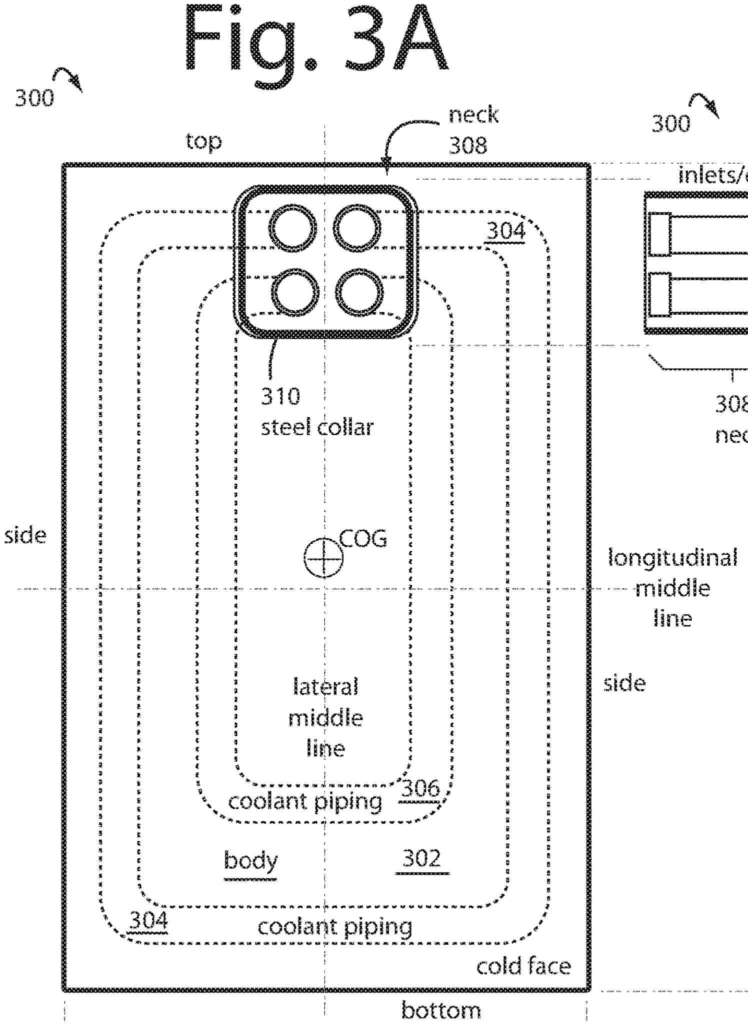
Fig. 3B
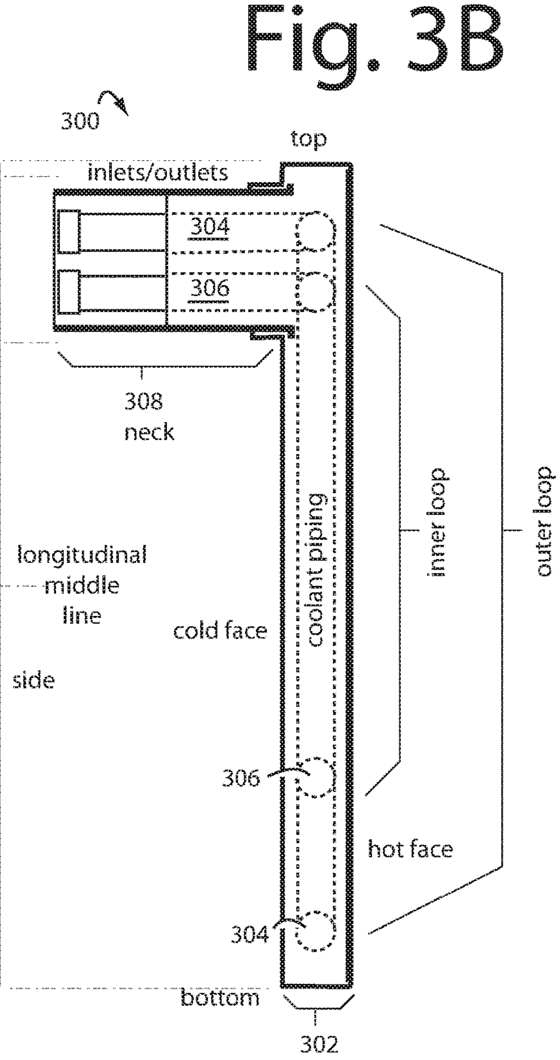
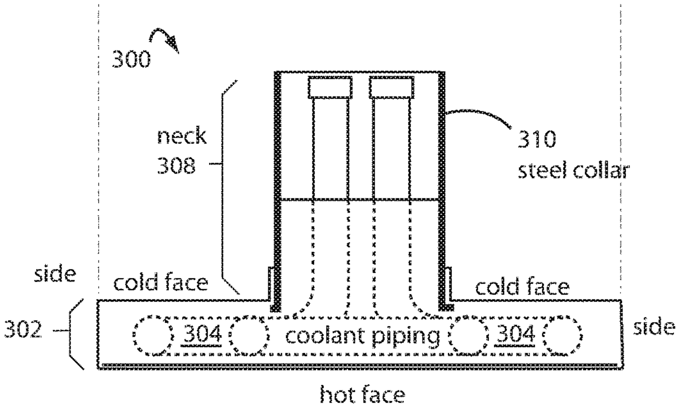
Fig. 3C

600

SINGLE MOUNTING CAST IRON OR COPPER STAVE COOLER

CROSS-REFERENCE TO RELATED APPLICATIONS

This present application is a National Stage Entry of International Patent Application No. PCT/US2018/051231, filed Sep. 14, 2018, entitled WEAR RESISTANT SINGLE PENETRATION STAVE COOLERS, which is a continuation-in-part of U.S. patent application Ser. No. 16/712,912, filed Dec. 12, 2019, entitled METHOD FOR STABILIZING THERMAL CONDUCTION OF BLOCK COOLERS WITH CAST-IN COOLANT PIPES, now issued as U.S. Pat. No. 10,684,078, which is a continuation-in-part of U.S. patent application Ser. No. 16/422,909, filed May 24, 2019, entitled METHODS FOR MANUFACTURING COPPER BLOCK COOLERS, now abandoned, a continuation-in-part of U.S. patent application Ser. No. 15/815,343, filed Nov. 16, 2017, entitled LONG CAMPAIGN LIFE STAVE COOLERS FOR CIRCULAR FURNACES WITH CONTAINMENT SHELLS, now issued as U.S. Pat. No. 9,963, 754, U.S. patent application Ser. No. 15/968,272, filed May 1, 2018, entitled RICH GLYCOL COOLING SYSTEMS FOR PYRO-METALLURGICAL FURNACES, now abandoned, U.S. patent application Ser. No. 16/290,922, filed Mar. 3, 2019, entitled WATER PIPE COLLECTION BOX AND STAVE COOLER SUPPORT, now issued as U.S. Pat. No. 10,954,574, which is a continuation-in-part of U.S. patent application Ser. No. 13/148,003, filed Dec. 23, 2011, entitled PANEL FOR FERROUS OR NON-FERROUS METAL MAKING FURNACE, now issued as U.S. Pat. No. 10,247,477, which claims priority from U.S. Provisional Patent Application No. 61/319,089, filed Mar. 30, 2010, entitled PANEL FOR FERROUS OR NON-FERROUS METAL MAKING FURNACE, and is a continuation-in-part of US Patent Application Ser. No. 13/147,996, filed Dec. 23, 2011, entitled APPARATUS AND METHODS FOR GAS TIGHT SECONDARY COPPER STAVE SUPPORT, now abandoned, which is a National Stage Entry of International Patent Application No. PCT/US11/30591, filed Mar. 30, 2011, entitled APPARATUS AND METHOD FOR GAS TIGHT SECONDARY STAVE SUPPORT, which claims priority from U.S. Provisional Patent Application No. 61/318,977, filed Mar. 30, 2010, entitled APPARATUS AND METHOD FOR GAS TIGHT SECONDARY COPPER STAVE SUPPORT, and U.S. patent application Ser. No. 16/101,418, filed Aug. 11, 2018, entitled WEAR-RESISTANT, SINGLE PENETRATION STAVE COOLERS, now issued as U.S. Pat. No. 10,364,475, which claims priority from U.S. Provisional Patent Application No. 62/701,832, filed Jul. 22, 2018, entitled WATER-BASED HEAT TRANSFER FLUID COOLING SYSTEMS INTRINSICALLY SAFE FROM BOILING LIQUID EXPANDING VAPOR EXPLOSION (BLEVE) IN VARIOUS PYRO-METALLURGICAL FURNACE APPLICATIONS, and which is a continuation-in-part of U.S. patent application Ser. No. 15/815,343, filed Nov. 16, 2017, entitled LONG CAMPAIGN LIFE STAVE COOLERS FOR CIRCULAR FURNACES WITH CONTAINMENT SHELLS, now issued as U.S. Pat. No. 9,963,754, the disclosures of which are incorporated herein in their entireties.

FIELD OF INVENTION

The present invention relates to stave coolers for circular furnaces with steel containment shells, and more particularly to cast-iron and cast-copper stave coolers with a single penetration required of a steel containment shell to accommodate a steel collar that entirely support the weight of the stave cooler inside a smelting furnaces, and that passes all the piping inlets and outlets through in one group for liquid cooling. The object of constructing the steel collars this way being to provide a match of the coefficients of expansion in the one penetration by using similar alloys to minimize stresses and avoid bonding and embrittlement issues with the connecting welds to the containment shells

BACKGROUND

Steel and non-ferrous metals are being smelted throughout the world in circular furnaces with steel containment shells. Some of these employ panel type stave coolers that completely line the interior walls to cool refractory bricks mounted to their hot faces. Their individual cooling actions are delivered by liquid coolants that circulate inside each stave cooler with piping that passes through penetrations of the steel containment shells to access an external heat exchanger. Each penetration of the steel containment shell requires reliable welds and seals to keep the hazardous process gases both inside the furnace and away from its operating personnel.

Production rates exceeding three tons of hot metal per cubic meter of working volume per day are now being reached with modern blast furnaces. This was made possible by using improved burden materials, better burden distribution techniques, tighter process controls, very high hot-blast temperatures, oxygen enrichment technology, pulverized-coal injection, and natural gas fuel enrichment. All of which result in much higher average heat loads and fluctuations that land on the stave coolers mounted inside the steel containment shells of up-to-date blast furnaces.

Integrated steelworks use blast furnaces to supply themselves the pig iron they use to make steel. The large gains being made in furnace-productivity have also placed overwhelming demands on cooling system capacities. The liquid-cooled stave coolers in blast furnaces first developed in the late 1960's became inadequate. High conductivity copper stave coolers have been needed since the late 1970's because these are better able to deal with the intense process heats now being generated in state-of-the-art, high stress furnaces. Copper stave coolers have also proved themselves capable of delivering furnace campaign lives that now exceed fifteen years.

The average thermal load levels a stave cooler will be subjected to depends on where it will be positioned within a blast furnace and how the furnace is operated. See FIG. 1. Cast-iron staves can still be successfully used in the less demanding middle and upper stack areas of blast furnaces, but the much higher average heat loads below in the lower stack, Belly, Bosh, Tuyere Level, and Hearth all require the use of higher performing, but more costly copper staves.

Cast iron staves are less efficient at cooling than are copper staves because the cast iron metal is relatively much lower in thermal conductivity. Their inherent thermal resistance allows heat to pile up too high if too much loading is presented. Poor internal bonding can add unnecessarily to the overall thermal resistance. Otherwise, cracks develop in the cast iron and the cracking can propagate into the steel pipes themselves. Cast iron staves have a de-bonding layer that adds to a thermal barrier between coolants circulating in its internal water-cooling tubes and the hot faces of the cast iron stave body. Both such effects conspire in reducing the overall heat transfer abilities of cast iron staves.

Such inefficiencies in cast iron stave heat transfer performance can overstress cast iron staves when hot face temperatures drive up over 700° C. Thermal deformations are hard to avoid. Cast iron stave bodies can also suffer phase-volume transformations when operated at very elevated temperatures. Fatigue cracking, stave body material spalling, and cooling pipes exposed directly to the furnace heat are common failures. Stave coolers can also be used in reduction vessels for the production of direct reduced iron (DRI).

A stave cooler is described by Todd Smith in United States Published Patent Application US-2015-0377554-A1, published Dec. 31, 2015. The Abstract reads, > A stave comprising an outer housing, an inner pipe circuit comprising individual pipes housed within the outer housing, wherein the individual pipes each has an inlet end and an outlet end and wherein each pipe may or may not be mechanically connected to another pipe, and a manifold, integral with or disposed on or in the housing; wherein the inlet and/or outlet ends of each individual pipe is disposed in or housed by the manifold. The manifold may be made of carbon steel while the housing may be made of copper.

Todd Smith further adds, "Each of the inlet and outlet ends of each individual pipe may be surrounded in part by cast copper within a housing of the manifold."

When liquid-cooled stave coolers are disposed inside the steel containment shells of smelting furnaces, each conventional coolant connection must have a corresponding penetration or access window in the shell in order to complete the hose connections outside. And, conventionally, each stave cooler must be bolted to or otherwise mechanically attached to the steel containment shell to provide vertical support to itself and the refractory brick lining it supports and cools on its hot face.

The hot smelting inside the furnaces produces very hot, toxic, and often flammable process gases that will find escape paths between the refractory bricks, and between the stave coolers and out through any openings in the containment shell. So these penetration points must have good gas seals. One penetration is easier to seal and keep sealed than several. While two or more fixed points will lead to thermally induced mechanical stresses.

But because the stave coolers, containment shells, and refractory brick are all subject to thermal expansion forces, the gas seals can be compromised over the campaign years by constantly being worked back and forth. Stave coolers like those described by Todd Smith, have many independent circuits of coolant piping inside, and each produces pairs of coolant connection ends that must be passed out back and through the containment shell.

Todd Smith describes a "manifold" that can be made of carbon steel on the back of a housing that may be made of copper. He points out that his stave 100 provides for ease of installation since it reduces the number of access holes or apertures required in the furnace shell 51 necessary for the inlet/outlet piping 108 to and from 100 through furnace shell 51. And he says, at paragraph [0094], that stave 100 is of very strong construction to provide much of the support necessary for installation of the stave 100 on furnace shell 51. The effects of stave expansion/contraction due to temperature changes in the furnace are minimized since individual pipe connections to furnace shell have been eliminated. And, stave 100 reduces weld breaches in pipe connections with furnace shell 51 since such connections have been eliminated. Todd Smith says further that his stave 100 reduces the importance/criticality of any support bolts needed to help support stave 100 on furnace shell 51 since such bolts are no longer relied upon to independently support stave 100 since manifold 106 carries much of the load required to support stave 100 on furnace shell 51.

A stave cooler that has one-only through-bulkhead neck that is always collared in an appropriate steel is needed in the industry to control process gas sealing and containment. All of the coolant piping from all the coolant circuits within a single rectangular copper body must pass through in a single tight group to then connect externally outside the steel containment shell. This minimizes the adverse effects of thermal expansion and contraction to manageable levels. Tightly grouping the individual pipe connections through the furnace shell limits the deteriorating forces at work.

Towards these ends, stave coolers must depend entirely for their vertical mechanical support by a single hanging of the through-bulkhead in a single corresponding penetration of the containment shell. Carrying only "much of the load" leaves the door open to more than one penetration of the steel containment shell per stave cooler. The two jobs of supporting the stave cooler's weight, and connecting all the coolant piping, must always be shared in a single through-bulkhead neck.

SUMMARY

Briefly, cast-iron and cast-copper stave cooler embodiments of the present invention have all of the stave cooler's weight supported inside a furnace containment shell by a single gas-tight steel collar on the backside. All the coolant piping in each cooler has every external connection collected and routed together through the one steel collar. A wear protection barrier is disposed on the hot face. Such is limited to include at least one of horizontal rows of ribs and channels that retain metal inserts or refractory bricks, or pockets that assist in the retention of castable cement and/or accretions frozen in place from a melt, or an application of an area of hardfacing that is welded on in bead, crosshatch, or weave patterns.

SUMMARY OF THE DRAWINGS

FIGS. 3A-3C are cold face, side, and bottom edge view diagrams of a stave cooler embodiment of the present invention;

DETAILED DESCRIPTION OF THE EMBODIMENTS

Iron smelting furnaces operate in highly reducing environments and produce dangerous levels of toxic and highly flammable carbon monoxide (CO) gas. Carbon monoxide is a colorless, odorless, and tasteless gas that is slightly less dense than air. It is toxic to hemoglobic animals when encountered in concentrations above about 35-ppm. Carbon monoxide is produced from the partial oxidation of carbon-containing compounds. It forms when there is not enough oxygen to produce carbon dioxide ($CO_2$), such as when smelting iron. In the presence of atmospheric concentrations of oxygen, carbon monoxide burns with an invisible blue flame, producing carbon dioxide.

It is therefore very important to control and stop errant carbon monoxide process gases that pass through gaps between stave coolers, cracks in the castable refractory cement, and seals welded into the steel containment shells at the coolant connections and stave support fasteners.

Copper is highly preferred over cast iron for stave coolers because the thermal conductivity of copper is so much better than cast iron. But copper is relatively soft and easily abraded, compared to cast iron. The churning and roiling of the "coke" inside a furnace is highly abrasive to the walls, especially in the upper reaches. Copper stave coolers must therefore have some sort of abrasion resistant facing incorporated into their hot faces if they are to survive in a campaign that extends ten years or more.

Figure 1:
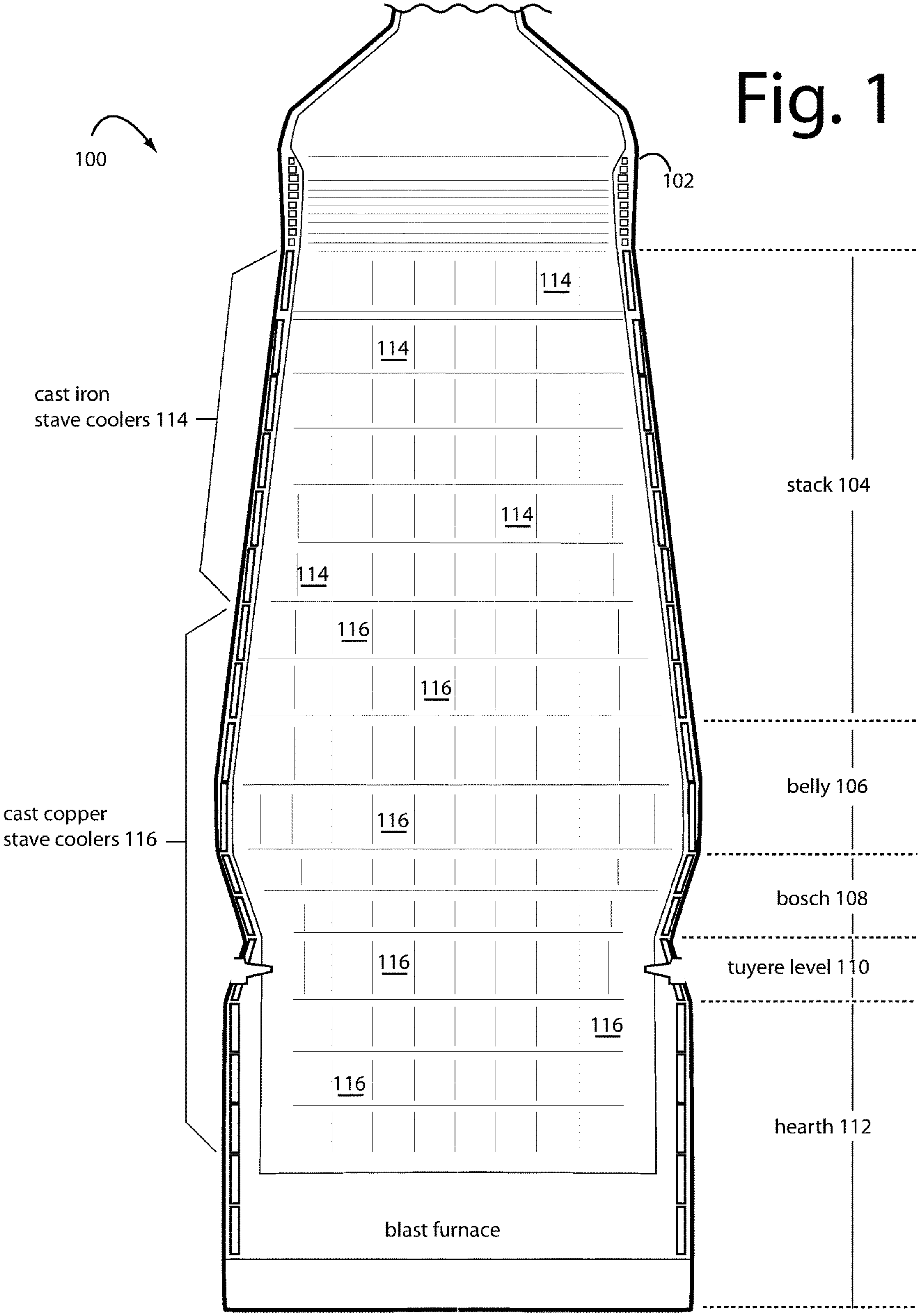
FIG. 1 is a cross sectional view diagram of a vertically orientated metal smelting or converting furnace embodiment of the present invention with a steel containment shell that has only one penetration per stave cooler for liquid coolant circulation.
Figure 6:
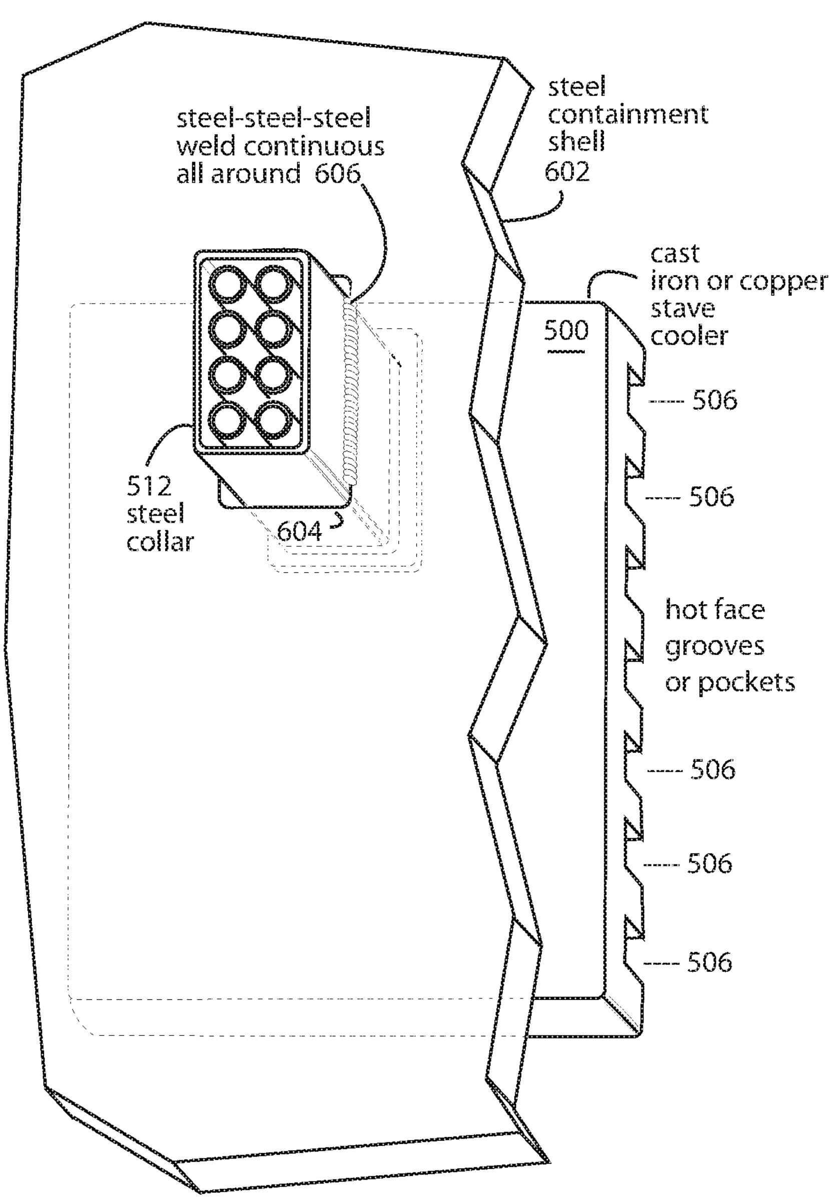
FIG. 6 is a perspective view and cutaway diagram of a stave cooler embodiment of the present invention like that of FIGS. 1, 2, and 3A-3C mounted and welded inside a steel containment shell.

FIG. 1 represents a typical blast furnace 100 in which various stave cooler embodiments of the present invention have been installed inside a steel containment shell. FIG. 6 shows the novel way these mount and assemble in detail.

In reduction smelting, the ore is reduced by carbon in the presence of flux to yield molten metal and slag. Coal is used instead of coke in reduction vessels that produce DRI. The typical blast furnace 100 includes a steel containment shell 102 with several essential zones of operation inside: a stack 104, a belly 106, a Bosch 108, a Tuyere level 110, and a hearth 112. The average operating temperatures are much more severe in the lower elevated stack 104 and below, and therefore heat loading is more demanding on its stave coolers. Compared to those in the middle stack 104 and above.

A liquid-cooled, cast iron type stave cooler embodiment of the present invention is therefore used in the middle stack 104 and above. Such cast iron stave coolers are referred to herein by the general reference numeral 114. Cast iron material offers superior abrasion resistance, but is not as thermally conductive as copper. Its inherent thermal resistance is problematic and iron stave are prone to cracking.

A cast copper type stave cooler embodiment of the present invention is therefore used in the lower stack 104 and below. Such cast copper stave coolers are referred to herein by the general reference numeral 116. High quality copper material offers superior thermal conductivity, but is easily abraded by the agitation and churning of the materials inside the furnace, and therefore must include an abrasion resistant facing incorporated into the entire outside surface area of the hot faces of each cast copper stave cooler.

Figure 2:
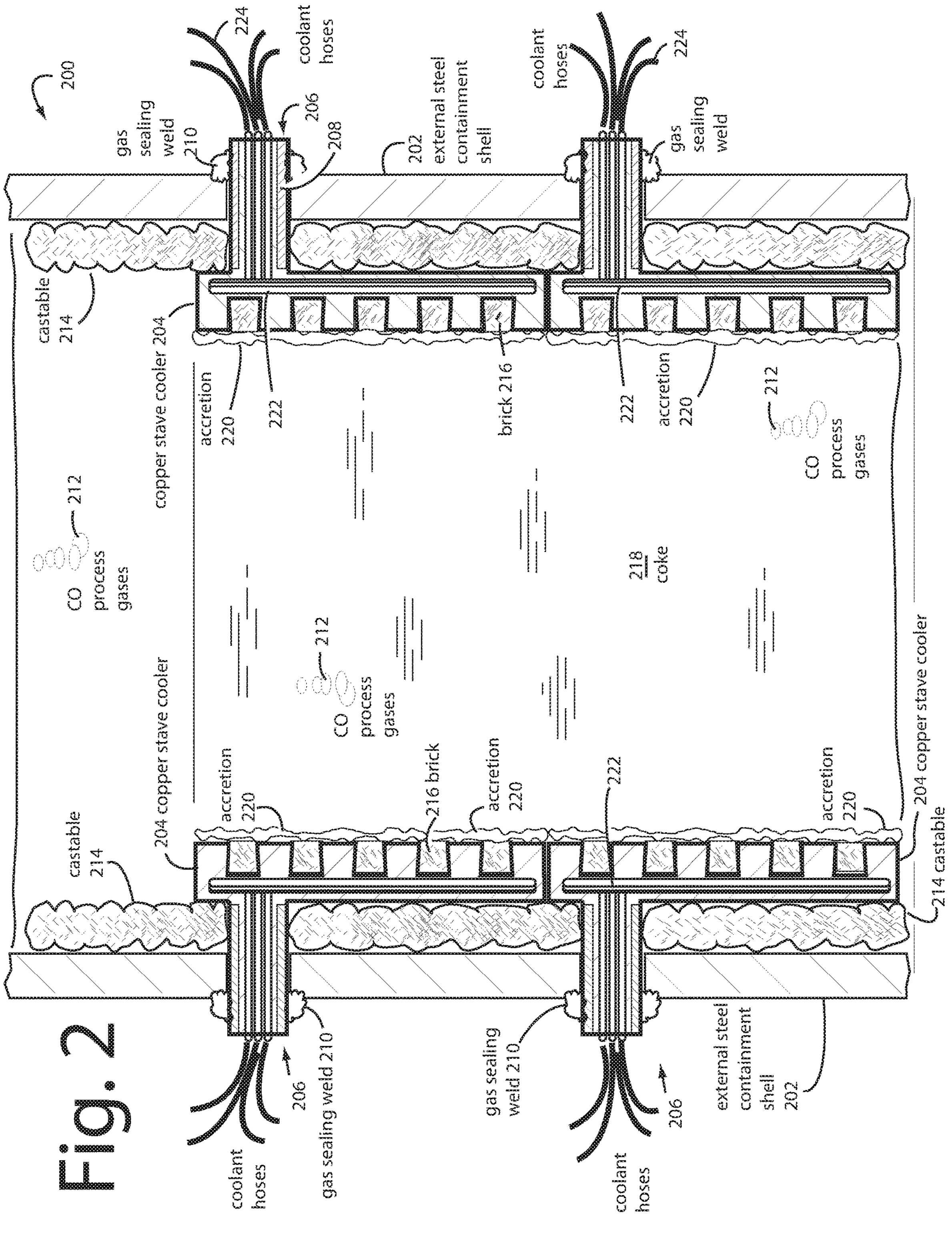
FIG. 2 is a cross sectional view diagram of a middle section of a furnace like that of FIG. 1, and represents the way stave cooler embodiments of the present invention seal out the escape of process gases with steel-to-steel welds around steel collars on the protruding necks, and have castable refractory cement packed in behind them. Bricks are inserted into tapered grooves. When pockets are provided instead, the pockets are filled with refractory castable or ram. The steel containment shell is penetrated only once per stave cooler, and all piping for liquid coolant circulation is gathered together in a single group to pass through the protruding necks inside their respective steel collars.

FIG. 2 represents a section of an iron-smelting furnace 200 in an embodiment of the present invention that uses either cast iron stave coolers 114 (FIG. 1), or cast copper stave coolers 116. In this example, the insides of an external steel containment shell 202 are lined with copper stave coolers 204. These each have a single protrusion 206, and each such protrusion 206 is jacketed in a steel-to-steel welding collar 208.

A completed annular steel-to-steel weld 210 secures the mounting of each copper stave coolers 204 and prevents the uncontrolled escape of process gases 212. A castable refractory cement 214 is packed in behind each copper stave cooler 204, in front of the inside walls of the steel containment shell 202, to further prevent any uncontrolled escape of process gases 212.

Cast copper stave coolers require an abrasion resistant facing or layer incorporated into their hot faces if their campaign lives are to exceed ten years. Cast iron stave coolers do not because the cast iron itself is very wear resistant.

The hot faces of the copper stave coolers 204 can therefore be finished in a number of different ways to accommodate materials to limit erosion caused by roiling abrasion inside a typical smelting furnace coke 218.

A conventional technique has been to horizontally groove the hot faces to retain rows of refractory brick, castable refractory cement, or even cast iron metal inserts. In alternative embodiments, the hot faces include a weld overlay or spray coating of abrasion resistant metal or ceramic. For example, nickel and chromium for the weld overlay and metal spray coatings. Silicon dioxide is useful for the ceramic spray coatings.

A further option that will increase abrasion resistance involves machining vertical or horizontal grooves into the hot faces for the later insertion of matching metal inserts during installation.

FIG. 2 simplified a range of possible abrasion resistant facing types by its showing rows of refractory bricks 216 inserted into horizontal grooves on the hot faces. Such bricks would ordinarily continue over to cover the copper lips of the grooves. Alternatively, the entirety of the hot faces of the stave coolers can be deeply dimpled or pocketed to better retain castable refractory cement, instead of grooving or slotting.

Smelting furnace coke 218 will helpfully form a layer of accretion 220 as it chills on the hot faces of the copper stave coolers 204. Such accretion includes condensed gases, slag, and metal. An internal arrangement of liquid coolant piping 222 inside the copper stave coolers 204 are all routed in a single group for external connection with hoses 224 outside the steel containment shell 202. They must all pass through the one, single protrusion 206 of their respective stave cooler 204.

Conventional drilled billet block type of stave cooler fabrication is not a practical alternative embodiment of the present invention because too much drilling and plugging is required to get all the internal coolant passageways to begin and end in a single group within the single protrusion 206 (inside steel-to-steel welding collar 208).

Iron-smelting furnaces that use liquid-cooled copper stave coolers inside their steel containment shells can leak carbon monoxide (CO) gas through any of the many penetrations in the containment shell provided for the liquid coolant connections. These penetrations all need to be sealed, and the seals must stay tight over the campaign life of the furnace. Carbon monoxide gas is very toxic, odorless, colorless, and can burn very hot in ordinary air with an invisible flame. These are why it's so hazardous. Embodiments that require welding a steel collar to a drilled billet are not preferred due to an inherent high probability of weld failure.

In one liquid-cooled stave cooler embodiment of the present invention for smelting furnaces with steel containment shells, a solid copper stave body is cast in a flattened and rectangular shape. They may also be curved slightly to fit better in upright, cylindrical and round furnaces. These stave coolers are typically about 2.5 meters tall, 1.0 meter wide, and 120 mm thick. So in general, embodiments like liquid-cooled stave coolers 114, 116, and 204 are substantially taller than they are wide, and are substantially wider than they are thick.

FIGS. 3A-3C represent a cast copper cooler stave 300 in a typical embodiment of the present invention. All corners and edges are finished eased and rounded. (Sharp edges adversely concentrate mechanical stresses in the castable refractory cement.) A copper body 302 is cast over preformed and pre-shaped independent circuits of coolant piping 304 and 306. A single, protruding neck 308 is collared completely by a steel collar 310.

Steel collar 310, copper neck protrusion 308, and copper body 302 will not bond together very well in a steel-to-copper weld. A much more secure and gas tight attachment is needed. So steel collar 310 is preferably embedded into the copper of neck 308 and body 302 during casting. See FIG. 4. For casting purposes, steel collar 310 may be fabricated in two parts. A first part, e.g., of stainless steel, cast into the copper stave, and then the second part, e.g., carbon steel, only attached to the first part by specialty welding after such casting is completed.

The entire weight of these copper stave coolers bear entirely on their steel collars 310, and so the two must never separate even with this burden. The embedded end of steel collar 310 can be advantageously fabricated to have its edges turned out in a flare to mechanically "lock" into the copper casting. Anchors 813 (FIG. 8) could also be added to the steel collars to increase mechanical locking with the copper.

Turning now to the problem of sealing necks 308 to their corresponding penetrations in the steel containment shells, neither cast iron nor cast copper stave coolers would weld very well directly, without steel collar 310, because of their respective metal dissimilarities, e.g., cast iron to steel, or cast copper to steel. But, good gas tight welds outside the containment shell are mandatory to stop the escape of errant process gases and to mechanically support and secure the stave cooler to the containment shell.

And so any part of the stave coolers that passes through steel containment shells 102, 202 must be "adapted" to be able to have that part welded to the steel of the containment shell.

The copper in neck 308 is a continuous part of the copper casting of body 302. Such copper casting in neck 308 may not completely fill the spaces inside the distal end of steel collar 310. And so those spaces left can be stuffed with a packing material to impede any wayward process gases that get as far as inside neck 308.

FIGS. 3A-3C are intended to illustrate that all the independent circuits of coolant piping in a stave cooler must be grouped together and terminate only within neck 308. These independent circuits are then externally connectable, e.g., with flexible coolant hoses 224 (FIG. 2,) outside steel containment shell 202.

The placement and orientation of neck 308 on the cold face of body 302 is critical. This one point provides all the vertical support of the entire weight of stave cooler 300 on the inside of containment shell 102, 202. Stave cooler 300 should hang straight on its own like a picture frame does on a single hook on a wall, as in FIG. 3A. However, with respect to FIG. 3B, it may be necessary for the bottom to tilt in or out toward the inside of containment shell 102, 202, relative to the top, in order to follow the inside profile and contours of the furnace.

A number of bolts or struts may be disposed on the cold face for attachment to or standoff from the steel containment shell. These can help set any top or bottom forward tilt of the liquid-cooled stave cooler needed to push away from its otherwise hanging straight and vertical with respective to FIG. 3B.

The stave cooler 300, as seen in FIG. 3A, will hang the straightest if neck 308 is disposed close to the top edge and straddles an imaginary lateral middle line. If the construction of stave cooler 300 is symmetrical about this imaginary lateral middle line, its center of gravity (COG) will be bisected.

Neck 308 and steel collar 310 are shown in FIGS. 3A-3C as nearly square with rounded corners. But they can also be configured in the shape of a cylindrical "can". The corresponding penetrations provided in the steel containment shells 102, 202, would of course have to be round or oval. Special casting and fabrication methods may be needed to construct copper cast stave coolers 300.

Figure 4:
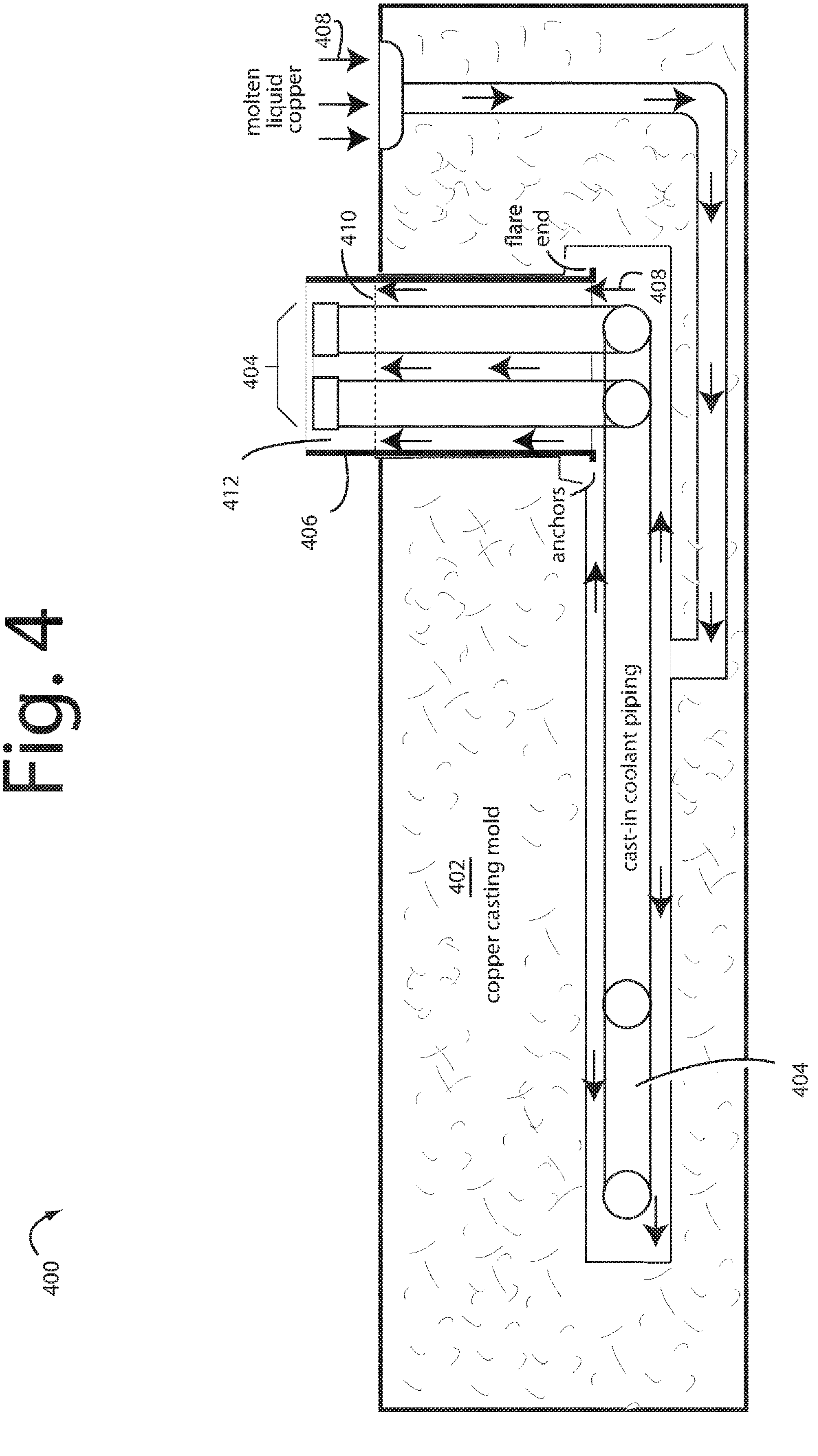
FIG. 4 is a cross sectional diagram of a copper casting mold useful in making the stave coolers of FIGS. 1, 2, 3A, 3B, and 3C.

FIG. 4 represent a method 400 for casting and fabricating, for example, copper cast stave coolers 300. Copper casting methods are both ancient and well known. Therefore many of the conventional details of copper casting need not be described here.

A mold 402 is split open to receive a network 404 of pre-shaped and pre-formed pipes and fittings. A steel-to-steel welding collar 406 is prepositioned inside of the top of mold 402, and enclosing the coupling ends of pipe network 404.

Mold 402 is positioned flat and level with steel-to-steel welding collar 406 pointing up and proud of the mold. A molten liquid flow of copper 408 is desired to come up and rise gently and evenly from under the center. Feeding from the edges would promote one sided shrinkage. The pour rises up inside and around to embed the steel-to-steel welding collar 406 and completely immerse and bond with pipe network 404. The pour is continued up to a particular level 410, and then the whole allowed to cool slowly and solidify.

A pure crystalline formation of the copper during casting is not preferred because such copper castings will not bond well with the coolant piping. A small grain copper is best, but not at the expense of electrical conductivity quality control measures that fall below a minimum of 80% of International Annealed Copper Standard (IACS). (Thermal conductivity tracks electrical conductivity, and electrical conductivity is simple and easy to measure in manufacturing.)

The best performance under high average heat loads in stave cooler use in smelting furnaces requires a balance of factors like molten metal heat, cooling rate after the pour, alloys added to improve strength and control grain sizes, deoxidants, optimized pipe bonding with the casting, and not falling below an electrical conductivity of 80% IACS so the thermal conductivity will be relatively free of the thermal resistance and gradients that plague cast iron.

An open space 412 may be deliberately left inside steel-to-steel welding collar 406.

The steel-to-steel welding collars here should have a tight seal with the protruding necks. (To prevent errant escaping process gases.) A practical way to construct these steel-to-steel welding collars is to use a length of structural steel tubing with rounded corners and no seams or welds. Large diameter round pipe is also possible. Preferably, the steel used in the structural steel tubing comprises a type of steel that has a thermal coefficient of expansion that matches the thermal coefficient of expansion of the steel of which the steel containment shell is comprised.

The casting of copper inside a steel-to-steel welding collars of carbon steel may not result in a clean joint between the two. It may be better to use a stainless steel or nickel alloy here for the collar if that is a problem. The level of liquid molten copper that is flooded into the steel-to-steel welding collar from below during casting can be limited to filling the bottom half only. The inside of the top half can be stuffed later with some suitable packing to prevent errant escaping process gases.

Each liquid-cooled stave cooler embodiment includes at least two independent circuits of coolant piping all of which are disposed as flat loops in a single common layer. One loop can often be laid inside another loop. All such independent circuits of coolant piping are arranged inside the solid copper stave bodies to be uniform, parallel, and proximate to the insides of the hot faces.

Each end of each independent circuit of coolant piping are all turned up together in a single group inside and through both the protruding neck and inside the steel-to-steel welding collar. Anchors 813 (FIG. 8) added to the steel collars would help to increase any mechanical locking with the cast copper. This requirement will frustrate drilling in billet methods because too many plugs become necessary to be practical.

In general, a liquid-cooled stave cooler for smelting furnaces with steel containment shells comprises a single, copper casting of a stave body that is rectangular in shape with a top edge, a bottom edge, left and right side edges, a hot face, and a cold face. Each such stave body is substantially taller than it is wide, and that is substantially wider than it is thick. Each stave may be straight or curved in plan, or straight, bent, or curved when viewed from the sides. The staves are configured to be cemented to the inside of a steel containment shell of a smelting furnace, e.g., to seal the escape of process gases.

There are at least two independent circuits of coolant piping all of which are cast into the stave body as flat loops in a single layer and arranged to be uniform, parallel, and proximate to the inside of the hot face.

An abrasion resistant facing is often incorporated into the entire outside surface area of the hot face of copper stave coolers. A shield material with a higher abrasion resistance than copper to the churning and roiling of material inside a furnace is needed. It is placed to environmentally protect the copper casting of the stave body. If a copper stave coolers is not protected with an abrasion resistant facing, then the copper stave cooler must be sufficiently liquid-cooled to always chill and maintain for itself a protective layer of frozen accretion on its hot face.

Copper stave cooler embodiments of the present invention will therefore invariably have a single, protruding elongated neck of the single copper casting is disposed proximate to the middle of the top edge and on the cold face of the stave body. It is configured to vertically support the entire weight of the liquid-cooled stave cooler within the steel containment shell from a single penetration. A steel-to-steel welding collar completely jackets the end of the protruding elongated neck. Such preferably comprises a prefabricated material similar to structural steel tubing having rounded corners and no seams or welds.

Every stave cooler embodiment of the present invention will therefore always have a steel-to-steel welding collar made of a type of steel with a thermal coefficient of expansion that substantially matches the thermal coefficient of expansion of the type of steel of which a steel containment shell is comprised. Each end of each independent circuit of coolant piping are all turned up together in a single group inside and through the protruding elongated neck jacketed by the steel-to-steel welding collar.

Some stave cooler embodiments of the present invention will include an abrasion resistant facing incorporated into the entire surface area of the hot face can include a number of horizontal and parallel grooves cast into the solid copper stave body to retain one of refractory brick, castable refractory cement, and metal inserts.

These abrasion resistant facings may alternatively include a grid pattern of deep rectangular surface pockets or dimples cast into the solid copper stave body to retain castable refractory cement.

Any abrasion resistant facing incorporated into the entire surface area of a hot face may further alternatively include a deposited layer of weld metal on copper material.

The correct tilting and angular set of heavy stave coolers inside the containment seals into wet castable refractory cement during construction can be assisted by placing a number of struts or bolts on their backsides as spacers to the steel containment shell. Castable refractory material is placed after the stave coolers are installed, and these devices can maintain a standoff and tilt of the liquid-cooled stave cooler it would otherwise not assume.

In every embodiment, an annular steel-to-steel weld of matching types of steel is required between the outside of the steel-to-steel welding collar and the inside of a corresponding penetration of the steel containment shell. The critical advantage of making a good gas seal during construction and then maintaining later over the campaign life is process gases are prevented from escaping from the inside of the steel containment shell and injuring personnel or damaging equipment. Limiting to one penetration, and avoiding metal stress concentrations from material mismatches are avoided. Such reasons have been the cause failures of conventional seals, especially over long time periods of use.

Invariably, the independent circuits of coolant piping used in copper stave cooler embodiments comprise pipes of flexible tubing cast in liquid molten copper inside a mold which was flooded from the bottom. The liquid molten copper is allowed to slowly rise up and slowly cool inside the steel-to-steel welding collar.

As is conventional, a number of rows of parallel and horizontal grooves may be alternatively disposed on the entirety of the hot face. These assist in an attachment of refractory bricks or castable refractory cement.

Generally, all the outside corners and edges of stave cooler embodiments of the present invention are finished to be eased and rounded. Such assures that fewer thermal stresses will be imposed on any castable refractory cement in contact with such points.

Figure 5:
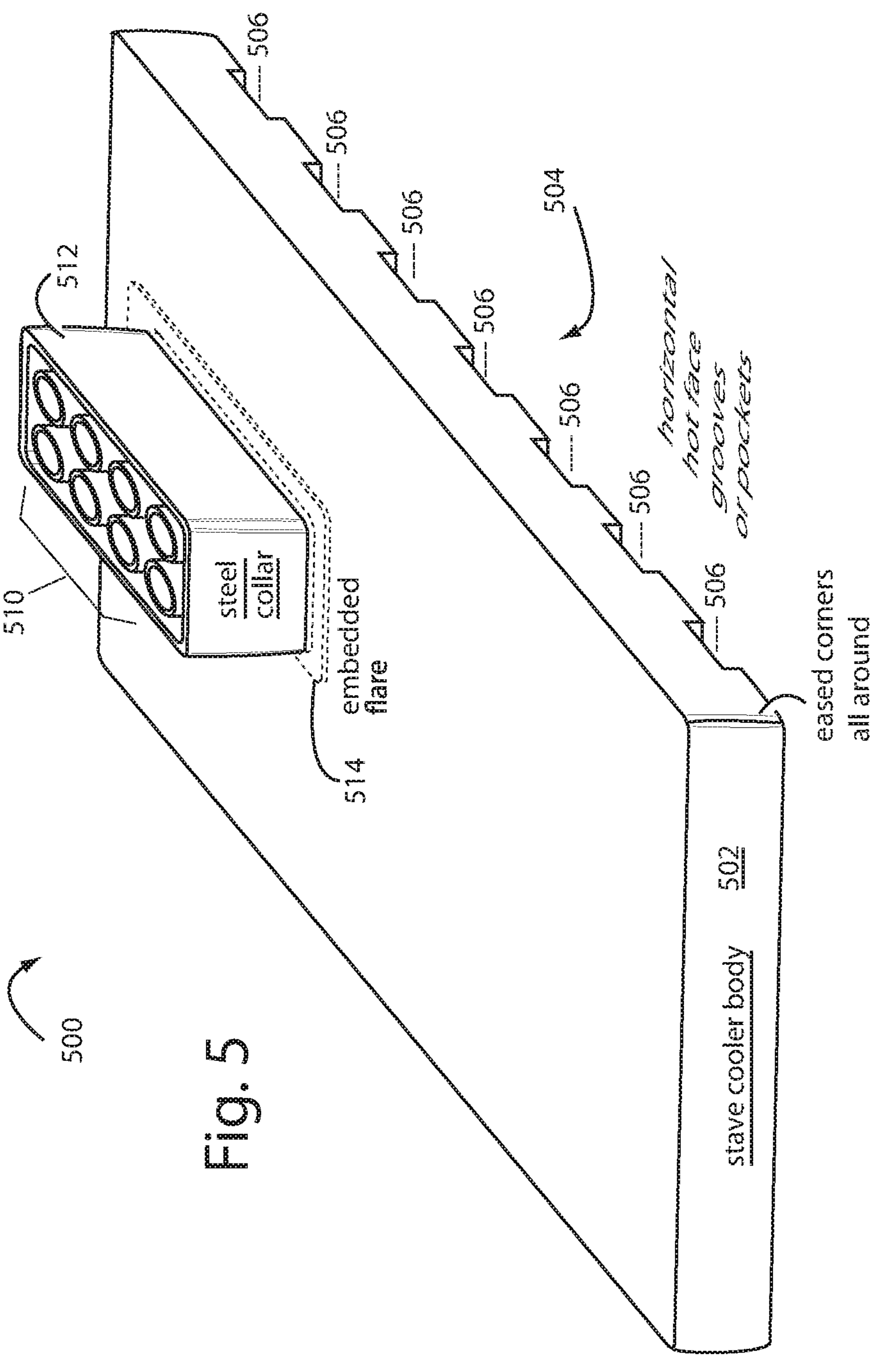
FIG. 5 is a perspective view diagram of a stave cooler embodiment of the present invention like that of FIGS. 1, 2, and 3A-3C.

FIG. 5 represents a stave cooler 500 in an embodiment of the present invention. Such is illustrated as a flat panel, but it may be advantageous to work in some convex or concave curvature. Here, stave cooler 500 comprises a flat panel body 502 of either cast iron or cast copper. If cast copper, a hot face 504 can include horizontal grooving 506 to lock in and hold conventional refractory bricks (not shown). Cast copper wears and abrades more easily than cast iron, so cast copper stave coolers need the protection afforded by conventional refractory bricks and other abrasion resistive materials.

Cast copper embodiments of stave cooler 500 comprise a small grain copper with a balance of factors like molten metal heat, cooling rate after the pour, alloys added to improve strength and control grain sizes, deoxidants, optimized pipe bonding with the casting, and not falling below an electrical conductivity of 80% IACS so its thermal conductivity will be relatively free of thermal resistance and gradients.

Stave cooler 500 further comprises a numbers of liquid coolant pipe loops or tubing embedded with the flat panel body 502 just inside hot face 504. These circulate liquid coolant that is pumped in and pulled out through a single external piping connection group 510 which is all collected together through a single steel collar 512. The single steel collar 512 is embedded into the flat panel body 502 during iron or copper casting and includes an annular flare 514, anchors, or other device to mechanically lock the pieces together, since simple bonding between dissimilar metals can be inadequate in these severe applications.

The operational safety of stave cooler embodiments of the present invention can be improved by circulating liquid coolants within them that are water-based but nevertheless intrinsically safe from boiling liquid expanding vapor explosion (BLEVE). Essentially, no more than 50% water is blended in with a single phase glycol alcohol like methanol ethylene glycol (MEG). The MEG operates as a desiccant and binds the water in a physical absorption. The present inventor, Allan MacRae, has disclosed the particulars of this in U.S. patent application Ser. No. 15/968,272, filed May 1, 2018, and titled, WATER-BASED HEAT TRANSFER FLUID COOLING SYSTEMS INTRINSICALLY SAFE FROM BOILING LIQUID EXPANDING VAPOR EXPLOSION (BLEVE) IN VARIOUS PYRO-METALLURGICAL FURNACE APPLICATIONS.

Every corner and edge of stave cooler 500 is eased and blunted to reduce cracking and separation of castable cement that is typically packed around and behind stave coolers to prevent outflows of hazardous process gases past them.

FIG. 6 represents the advantageous and novel way that stave cooler 500 mounts inside a circular furnace 600 with a steel containment shell 602. Only one penetration hole 604 is provided in steel containment shell 602 for each stave cooler 500. Steel collar 512 passes through and is continuously, and gas-tight welded all around with a steel-steel-steel weld 606. Such weld 606 must provide a long life, high reliability gas seal to keep internal hazardous process gases, like carbon monoxide (CO), from escaping. The full weight of stave cooler 500 is borne by the simple hanging of steel collar 512 inside the one penetration hole 604. Weld 606 and castable cement all around stave cooler 500 keep it from slipping off inside.

Water makes an excellent choice as a coolant because its low viscosity makes it easy to pump and its high specific heat means that coolant pumping volumes and speeds can be kept as low as is possible. A balanced combination of these considerations means the pumps in water-based cooling systems can be economized. But introducing water-based coolants into high heat ferrous and non-ferrous pyrometallurgical furnaces runs a risk of boiling liquid expanding vapor explosion (BLEVE).

Figure 7:
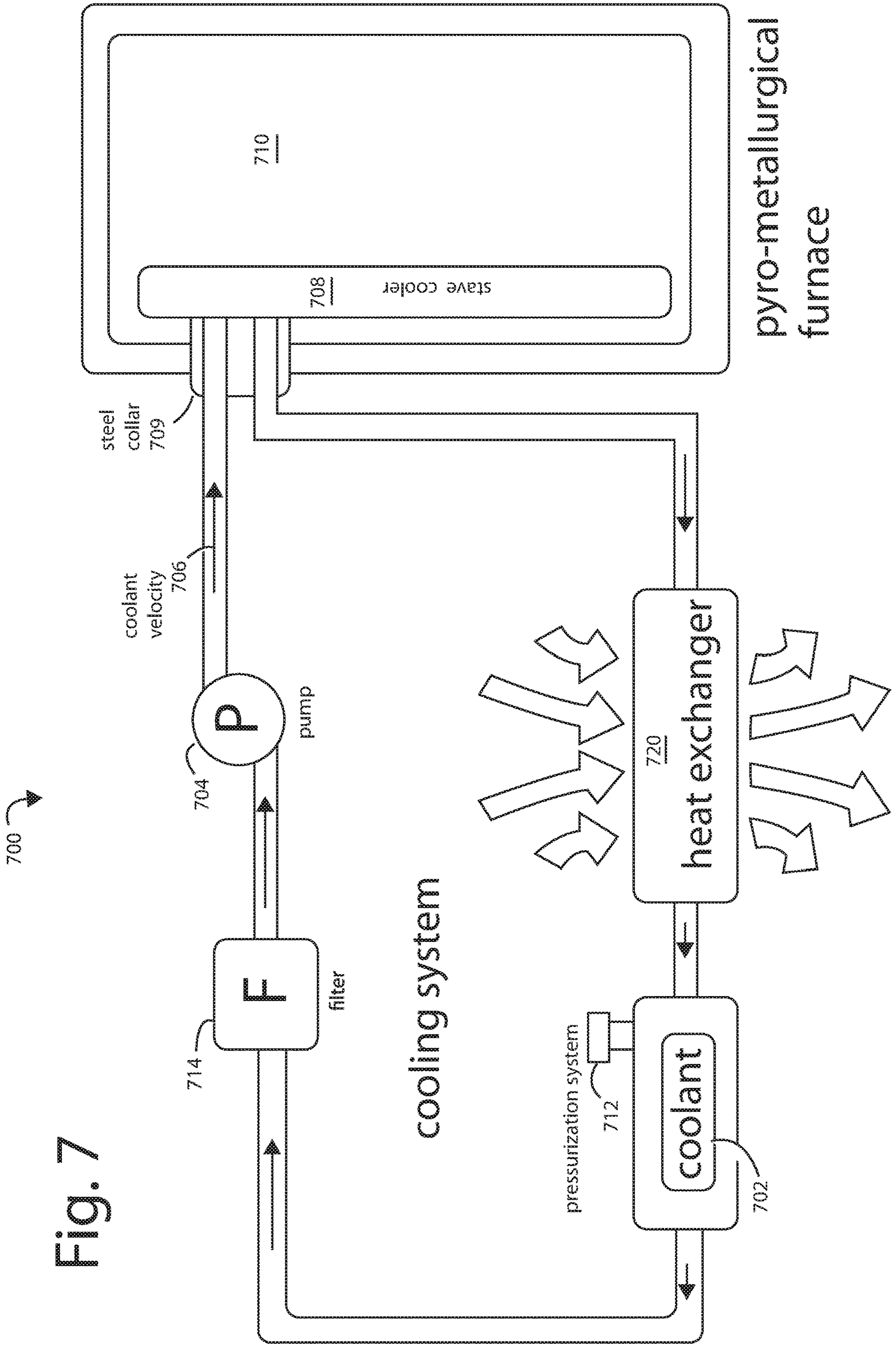
FIG. 7 is a functional block diagram in a schematic type view of a cooling system embodiment of the present invention that is intrinsically safe from boiling liquid expanding vapor explosion (BLEVE) should any of its liquid, water-based coolant escape or leak into a pyrometallurgical furnace.

FIG. 7 represents a water-based cooling system 700 in an embodiment of the present invention that is intrinsically safe from BLEVE. A heat transfer fluid mixture 702 comprises water, glycol alcohol, and corrosion inhibitors in a homogeneous solution that are circulated around in a closed loop by a liquid pump 704. The percentage of water used in the heat transfer fluid mixture 702 has both high and low limits. In general, water can in this use can range from 10% to 50%.

The minimum percentage of water that can be used is limited by the adverse impacts of increasing viscosity and reduced specific heat that bear on the acquisition and operating costs of liquid pump 704. As viscosity increases, it requires a greater pumping effort and a stronger liquid pump 704 to maintain a minimum coolant velocity 706. And as the specific heat of heat transfer fluid mixture 702 is decreased by diluting the water, the greater will be the pumping effort required of a larger capacity liquid pump 704 to maintain a higher, minimum level coolant velocity 706 that will compensate for the inefficiency.

In practice, the heat transfer fluid mixture must have a room-temperature viscosity of less than 20 mPa·s. And the heat transfer fluid mixture 702 must have a specific heat greater than 2.3 KJ/kg·K. Otherwise, the requirements for a suitable pump 704 become unreasonable and/or unmanageable.

The maximum percentage of water that can be used safely is limited by the risks of BLEVE. Short of that threshold, the mixed coolant blend 702 will burn, and not BLEVE, if it escapes from a cooler 708 with a steel collar 709 into a high heat ferrous or non-ferrous pyrometallurgical furnace 710. All the coolant circulation for each stave cooler 708 passes through in a single grouping within its respective steel collar 709. Stave cooler 708 is essentially the same as stave coolers 114, 116, 206, 300, and 500 of FIGS. 1, 2, 3A-3C, and 5.

Intermolecular bond types determine whether any two chemicals are miscible, that is, whether they can be mixed together to form a homogeneous solution. Here, the water and glycol in the heat transfer fluid mixture 702 easily join together in a homogeneous solution. When two chemicals like water and glycol mix, the bonds holding the molecules of each chemical together must break, and new bonds must form between the two different kinds of molecules. For this to happen, the two must have compatible intermolecular bond types. Water and MEG glycol do. The more nearly equal in strength the two intermolecular bond types are, the greater will be the miscibility of the two chemicals. Usually there is a limit to how much of one chemical can be mixed with another, but in some cases, such as with $CH_3OH$ (MEG) and $H_2O$ (water), there is no limit and any amount of one is miscible in any amount of the other.

As a consequence, the percentage of water in the heat transfer fluid mixture 702 will have a practical range between 10% and 50%. The optimum percentage of water plus corrosion inhibitors in the heat transfer fluid mixture 702 is generally about 25%. No excess water is left unabsorbed to support a BLEVE.

The heat transfer fluid mixture 702 is circulated in a closed system and pressurized by a pressurization system 712. Typical pressures run 2-7 bar. Raising the pressure inside the closed system raises the boiling point of the heat transfer fluid mixture 702. The minimum boiling point of the heat transfer fluid mixture 702 under pressure should be no less than 175° C.

A particulate filter 714 is used to remove rust particles, exfoliated mineral scale, and other solid contaminants from the heat transfer fluid mixture 702 as it circulates.

A chiller or heat exchanger 720 is used to remove and dispose of the heat gained by the heat transfer fluid mixture 702 in circulation, e.g., a cooler 708 inside furnace 710. Such chillers and heat exchangers are conventional.

Although FIG. 7 shows only a stave cooler 708, such could just as well be a panel cooler, or a cooling jacket for a top submerged lance (TSL), torch, or Tuyere to receive the benefits of intrinsically safe operation from BLEVE. Conventional applications dangerously bring water-based liquid coolants into close proximity with pyrometallurgical furnaces.

Figure 8:
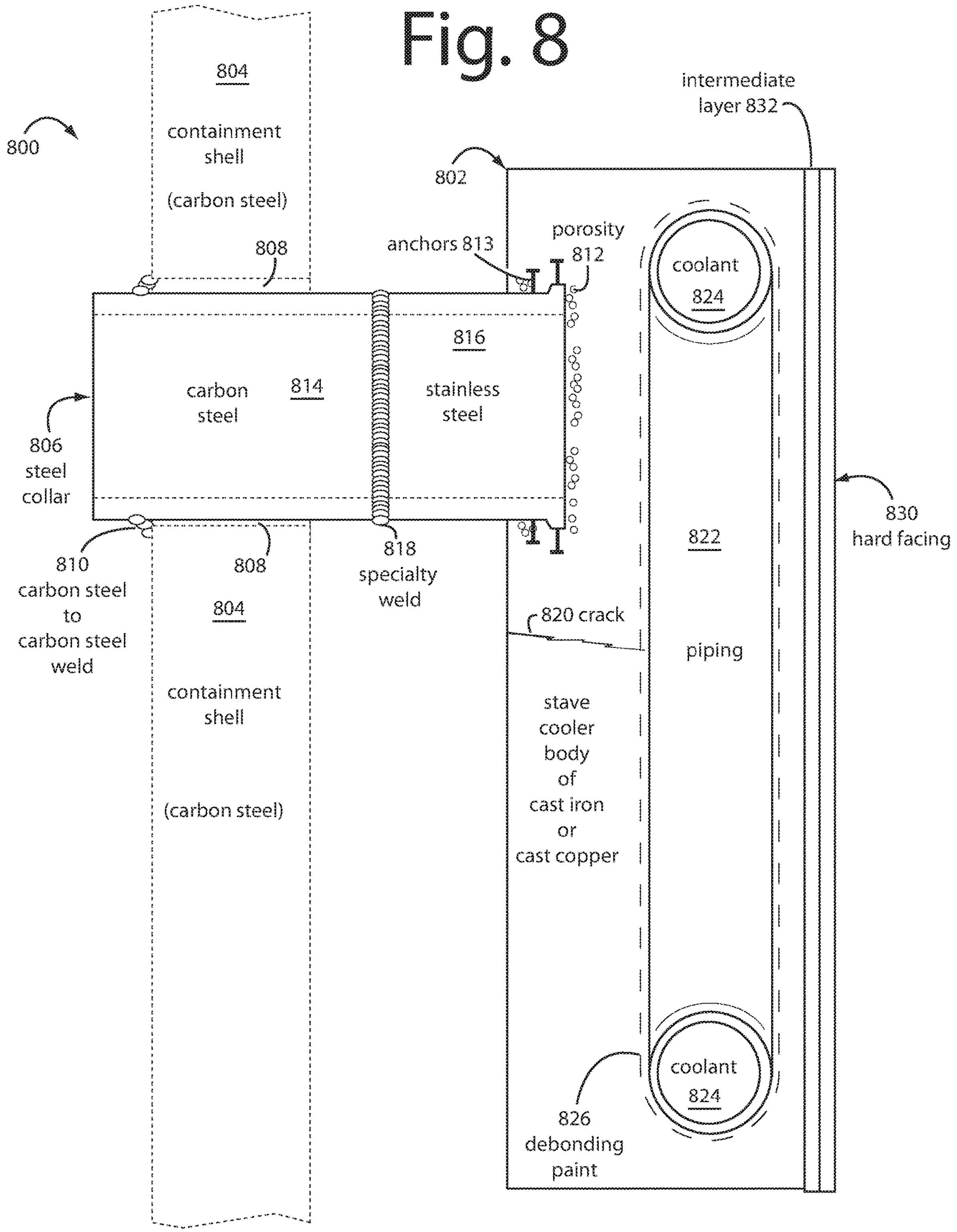
FIG. 8 is a cross sectional view diagram of a stave cooler embodiment of the present invention hanging inside a steel containment shell. This view details the location of a "specialty weld" that joins carbon steel and stainless steel (or nickel alloy) parts of a steel collar embodiment of the present invention.

FIG. 8 concerns itself with the characteristics of various metals to alloy or not alloy with other metals. Associated with that is how well metals will physically bond with other metals.

A stave cooler installation 800 in an embodiment of the present invention mounts a cast-iron or cast-copper stave cooler 802 inside a carbon-steel containment shell 804. A single steel collar 806 embedded at one end into stave cooler 802 provides the entire support of the weight by hanging from a single penetration 808 in containment shell 804. A carbon-steel-to-carbon-steel weld 810 stoppers process gas inside from passing through penetration 808.

Carbon steel does not bond well with copper, and the two often produce a "dirty" interface between them that causes gassing and porosity 812 during fabrication. Anchors 813 can be added to the steel collar 806 to improve its mechanical lock with the stave body casting.

Embodiments of the present invention join together a carbon-steel collar part 814 to a stainless-steel or nickel alloy collar part 816 with a "specialty weld" 818 that together serve as steel collar 806.

Collar part 816 typically comprises either a 300-series austenitic stainless steel or a nickel alloy. Type-304 and type-316 are both acceptable, as are type-309 and type-310. Referring to these as "300-series austenitic stainless" is a bit clearer to most. The 400-series martensitic stainless steels have a coefficient of thermal expansion close to the low carbon steel used in steel shell plate, but such can easily suffer from embrittlement during the casting process. Duplex grades, those half way between the 300-grades and 400 grades of stainless steel, could also be used effectively for collar part 816.

A dirty interface and porosity 812 will be avoided with the use of collar part 816 because the copper contacts only the stainless steel or a nickel alloy. However, the bonding of stainless steel or nickel alloy with copper, is no better than for carbon steel.

Welding austenitic stainless steels (collar part 816) to carbon and low alloy steels (collar part 814) are conventional in the process and construction industries. The British Stainless Steel Association (Sheffield, UK) says dissimilar metal welds involving stainless steels can be done using most full fusion weld methods, including tungsten inert gas (TIG) and metal inert gas (MIG). Welds using consumable fillers allow for better control of joint corrosion resistance and mechanical properties.

When deciding which weld filler to use, the joint (at weld 818) is considered to be stainless, rather than the carbon steel. Over-alloyed fillers, e.g., with increased nickel content, can avoid dilution of the alloying elements in the fusion zone of the parent stainless steel.

Common combinations of dissimilar steels involving stainless steel include plain carbon or low alloy structural grades and austenitic stainless steel grades such as 1.4301 (304) or 1.4401 (316). Carbon and alloy steels less than 0.20% C do not normally need a preheat when being welded to austenitic stainless steels. Carbon and alloy steels with carbon levels over 0.20% may require a preheat. High restraint joints, where the material thickness is over thirty millimeters, should also be preheated. Temperatures of 150° C. are usually adequate.

Carbon steels are more prone to hydrogen associated defects than are austenitic stainless steels, and so the welding consumables must be dry. Standard 308 type filler can be used for joining a stainless steel to carbon steel, and the more highly alloyed fillers, such as the 309 type (23 12L to BS EN 12072) are preferred. Cracking in the weld dilution zone can be a problem if a 308 type (19 9L to BS EN 12072) filler is used, because there can be too little ferrite, and martensite may form on cooling.

In higher temperature service, the differences in thermal expansion rates of the steels and filler can lead to thermal fatigue cracking. Long exposure times at these temperatures to welds with enhanced ferrite levels can result in embrittlement due to sigma phase formation. Nickel based fillers, such as Inconel, can produce better welds with lower thermal expansion rates than do the stainless steel fillers.

"Specialty weld" 818 thus cannot be done effectively outside the shop. But weld 810 can always be done on site.

Cracking 820 inside the body of stave cooler 802 can lead to cracking of internal piping 822 and a loss of its circulating liquid coolant 824. Coolants 824 comprised of water can be the cause of BLEVE and serious explosions and loss of life. So in the case of cast iron used in the body of stave cooler 802, a de-bonding paint 826 is applied to internal piping 822 during casting to prevent crack propagation.

Crack propagation into internal piping 822 is not a problem when copper casting is used for the body of stave cooler 802, and so de-bonding paint 826 is not necessary.

A hard facing 830 of abrasion resistant material can be applied as a thin layer on the hot face of stave cooler 802 to protect the stave cooler from wear and increase its campaign life. Depending on the exact materials used in hard facing 830, an intermediate layer 832 may be needed to improve bonding and durability.

The materials needed to intermediate between the materials of a more outer coating and a copper base or cast iron base are generally understood by artisans. However, which materials and what deposition processes are needed to apply such hard faces to our stave cooler base substrates of copper or cast iron are limited to those that through empirical experience produce the longest campaign lives.

Hard facing 830 here comprises an alloy of nickel and chromium, and/or molybdenum, and/or niobium.

Sandmeyer Steel Company (Philadelphia, PA) says its Alloy 625 is an austenitic type of crystalline structured nickel-chromium-molybdenum-niobium alloy with outstanding corrosion resistance and high strength over a wide range of temperatures from cryogenic to 1800° F. (982° C.).

The strength of Alloy 625 derives from a solid-solution hardening of the nickel-chromium matrix in the presence of molybdenum and niobium. Precipitation-hardening treatments are not required.

Alloy 625 is outstanding in a variety of severe operating environments in its resistance to pitting, crevice corrosion, impingement corrosion, intergranular attack, oxidation and carburization in high temperature service, and is practically immune to cracking caused by chloride stress corrosion.

Alloy 625 can be easily welded to copper and processed by standard shop fabrication practices.

Coolers principally cast from pure copper and that circulate water inside provide the best in high performance and are able to work in the severe environments of modern copper and iron furnaces. However, the relatively soft copper needs protection from wear, and the water in the coolants needs to be kept from BLEVE.

Wear in these furnaces is a combination of abrasion, impacts, metallic, corrosion, heat and other effects.

Castable cement slathered on the hot face surfaces of copper stave coolers can protect the copper from wear during use. The relatively cool surfaces precipitate and freeze jackets of accretion from the melt, and these form a principal wear barrier.

Other nickel-chrome alloys suited for abrasion resistance include Alloy-122, Alloy-622, Alloy-82, and Alloy-686. Some nickel-chrome alloys particularly suited for corrosion resistance include Alloy-122, Alloy-622, Alloy-686, and NC 80/20. In each case, minimum nickel content should be 55%, minimum chrome content 18%, and maximum iron content should be 6%.

But sometimes the frozen accretions will crack, scale, separate, and sluff off to expose the bare copper surface. New patches will freeze in place immediately, but the process and brief exposures can cause significant wear over the campaign life. Grooves, texturing, and pockets embedded as contour features in the hot face surfaces help to retain both castable cement and frozen accretions.

Metal and refractory brick inserts are also conventional ways that copper stave coolers have been shielded from wear. But the machining needed to finish off the grooves, ribs, and channels needed to retain the metal and refractory brick inserts is expensive. It is also very challenging to keep the inserts in tight firm contact with the stave cooler. Any looseness in the fit will allow the inserts to get too hot and that will accelerate wear. A stave cooler that would suffer this particular kind fate would be the types described by Todd Smith in US Patent Application Publication US 2015/0377554, published Dec. 31, 2015.

The refractory bricks illustrated in Todd Smith's FIG. 3, do not keep tight hold of the ribs and channels embedded in the stave cooler hot faces (as illustrated in Todd Smith's FIGS. 4 and 5). These refractory bricks do appear to have an advantage of being directly insertable, rather than needing to be slid in from the stave coolers' sides. Sliding in may not always be possible, especially in vertically oriented cylindrical furnaces.

Figure 9A:
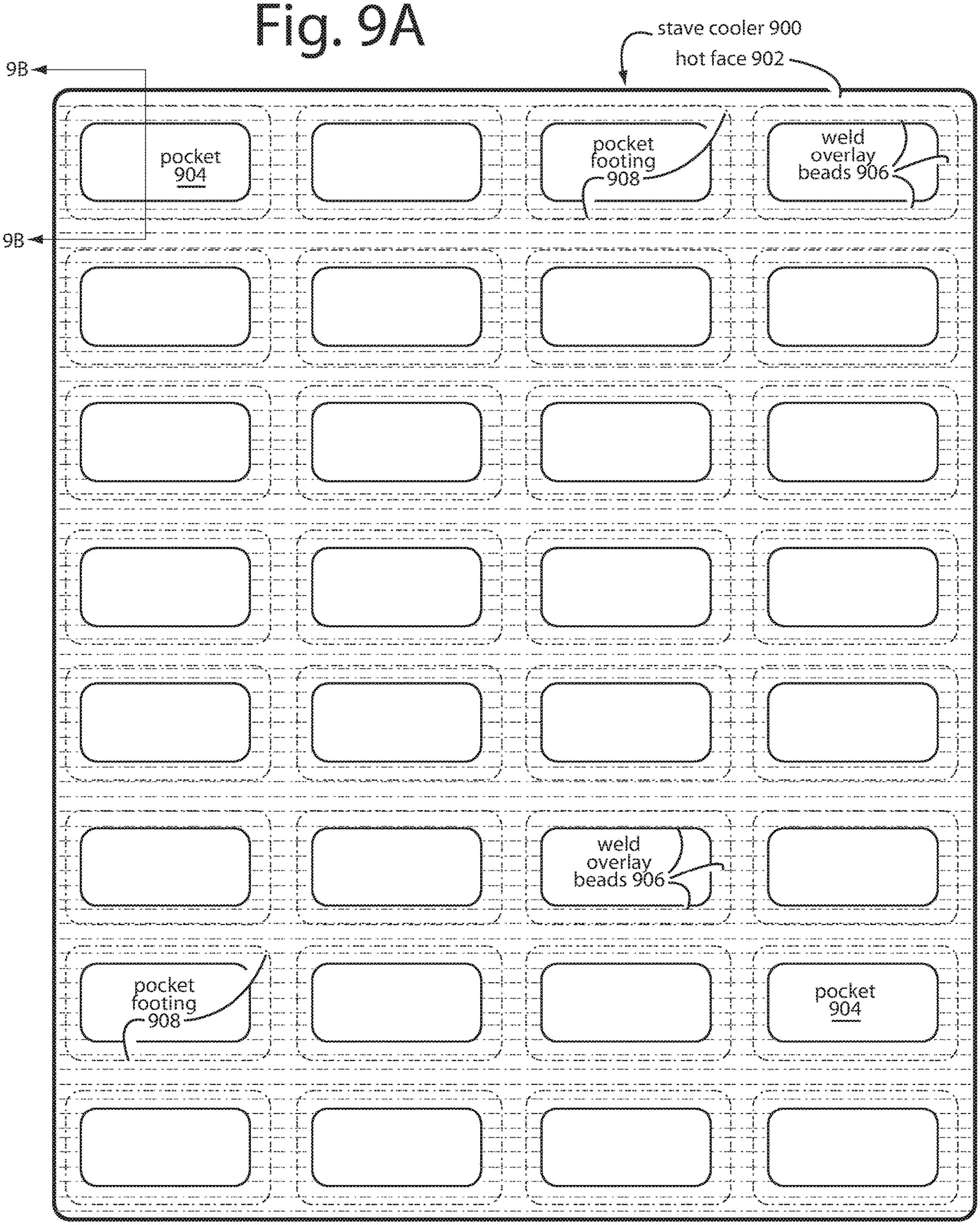
FIG. 9A is a plan view diagram of a hot face of a stave cooler fitted with pockets and hardfacing welding overlays.
Figure 9B:
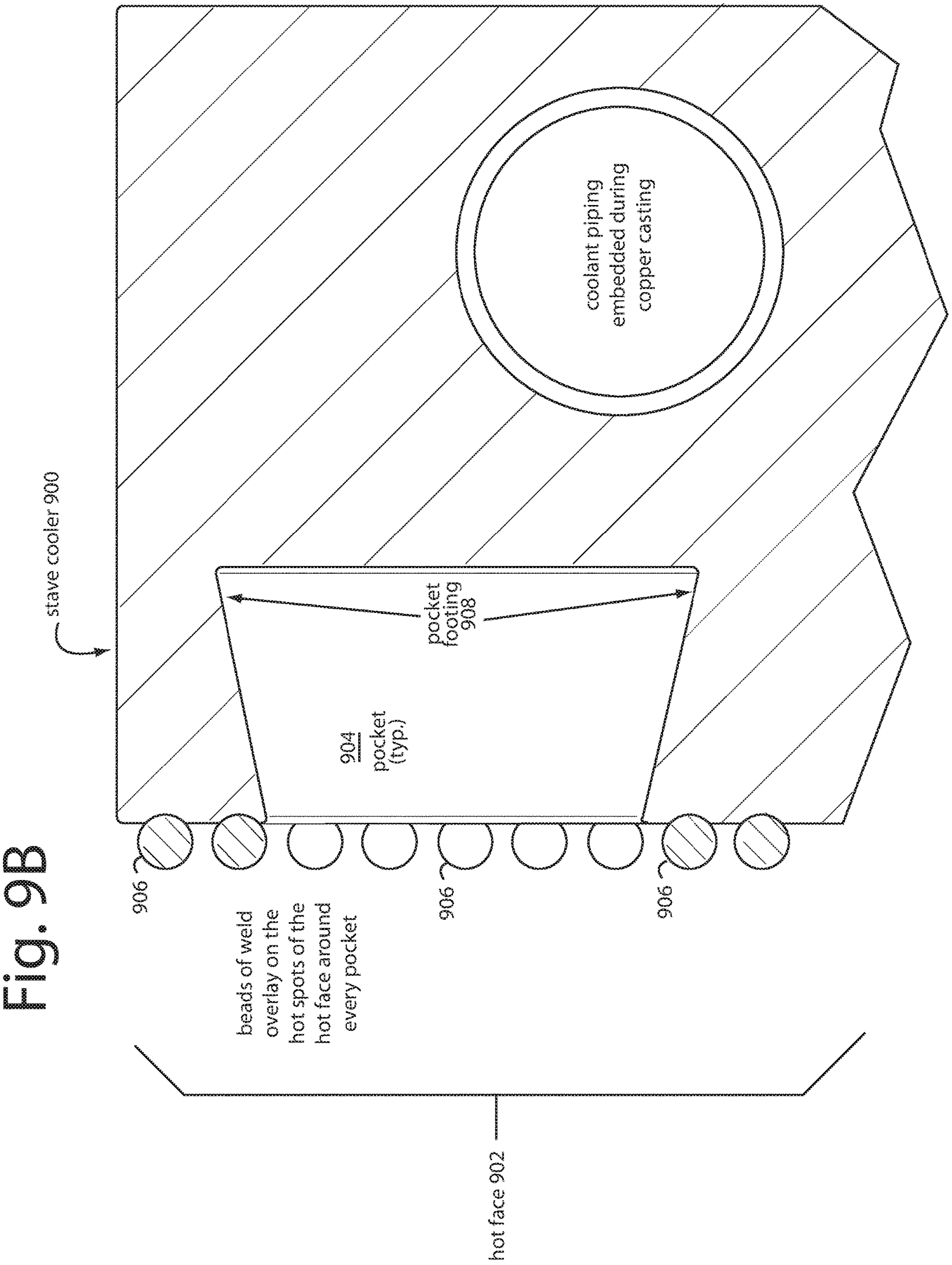
FIG. 9B is a cross-sectional view of one pocket of FIG. 9A taken along line 9B-9B.

FIGS. 9A and 9B represent applications in which copper stave coolers 900 and their hot faces 902 especially cannot be protected with refractory brick or metal inserts for practical or economic reasons. A number of pockets 904 are distributed on hot face 902. A hard facing weld overlay 906 is applied in bead, crosshatch, or weave patterns on the more exposed raised perimeters of hot face 902 surrounding each pocket 904.

FIG. 8, represents a hard facing 830 that is applied over a buffer or intermediate layer 832. Depending on the materials used in the hard facing 830, it may not be necessary to include any buffer or intermediate layer 832.

Various welding techniques can be used to fuse both similar and dissimilar materials to the copper metal surface of stave coolers 802 and 900. The hard facing 830 can be applied by welding beads 906 in groups in those portions of the hot face surface more subject to wear than others. In some cases, that will mean the entire surface will require a weld overlay, e.g., no pockets.

An improved copper stave cooler embodiment of the present invention has increased wear resistance to at least one of abrasion, impact, metal-to-metal contact, heat, and corrosion on an included hot face surface. A hardfacing comprising at least one alloy of nickel and chromium is fused on by welding. Sometimes to less than the entire surface, and only on those portions of the hot face surface predetermined to be more exposed during use to wear than are any other portions. The hardfacing is typically applied as a weld overlay of molten metal in an inert shield gas.

In FIGS. 9A and 9B, these copper stave coolers 900 can be further improved by including a plurality of castable cement retention pockets 904 disposed across the surface of the hot face 902. Each such pocket 904 includes inwardly tilting, shallow walls and footings 908 that operate to better retain a castable cement filling when in use. A perimeter of raised and more exposed copper base material surrounds each of the plurality of pockets. So, the application of such hardfacing is economized by placing it in bead patterns 906 on only the raised and more exposed copper base material of the perimeter.

Preferably, the copper base material to receive welding overlays is the equivalent of UNS C12000 if wrought or UNS C81100 if cast, which includes deoxidants and low residual phosphorous that promote good welds, reduced copper grain size, an electrical conductivity of at least 80% IACS, and improved embrittlement resistance during welding.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A single-mounting stave cooler for use in a furnace, comprising:

a cast iron stave body in which are cast but not bonded any liquid coolant steel piping wherein, such absence of bonding prevents cracks in the cast iron stave body from propagating through into the liquid coolant steel piping;

a single protrusion and jacketing steel-to-steel welding collar with a proximal end embedded, or otherwise anchored into a backside of the cast iron stave body, and positioned to enable the stave cooler to hang on and be entirely supported by a distal end passed from only inside and through a single gas-sealable penetration of a steel containment shell, and in which all external piping connections of the liquid coolant steel piping within are collected together as a single group and routed through and passing between the proximal and distal ends of the single steel-to-steel welding collar; and a wear protection barrier disposed on a hot face of the cast iron stave body and that is limited to include at least one of pockets and/or horizontal rows of ribs and channels able to retain metal inserts or refractory bricks, or that assist in the retention of castable cement and/or accretions frozen in place from a melt.

2. A stave cooler that includes liquid coolant piping cast inside, comprising:

a stave cooler body with a hot face and a backside and a liquid coolant piping cast between inside;

at least one external connection of the liquid coolant piping into the stave cooler body; and a single gas-tight steel collar on the backside able to support an entire weight of the stave cooler, and through which all of the at least one external connections of the liquid coolant piping are collected and routed together;

wherein, the stave cooler is limited to stave coolers that can mount only from an inside of a steel containment shell provided with a matching penetration to accommodate and seal by welding to the single gas-tight steel collar.

3. The stave cooler of claim 2, wherein:

the stave cooler body is cast from copper; and the liquid coolant piping is thin-wall and of a copper-nickel alloy that along its entirety is metallurgically bonded to and within the copper stave cooler body;

wherein the liquid coolant piping stabilizes long-term thermal conductivity through repeated thermal cycles.

4. The stave cooler of claim 2, wherein: the stave cooler body is cast iron; and the liquid coolant piping is of steel and is not bonded within the stave cooler body;

wherein, such lack of bonding prevents cracks from propagating into the liquid coolant piping from any that may develop in the cast iron stave cooler body.

5. The stave cooler of claim 2, wherein:

the single gas-tight steel collar has a proximal end that is anchored into the backside.

* * * * *